United States Patent
Taylor et al.

(10) Patent No.: US 8,863,369 B2
(45) Date of Patent: Oct. 21, 2014

(54) SLIT TUBE LOCKING LONGERON

(75) Inventors: Robert Taylor, Superior, CO (US);
Dana Turse, Broomfield, CO (US);
Larry G. Adams, Thornton, CO (US);
Mark Reavis, Berthoud, CO (US); Doug Richardson, Westminster, CO (US)

(73) Assignee: Composite Technology Development, Inc., Lafayette, CO (US)

( * ) Notice: Subject to any disclaimer, the term of this patent is extended or adjusted under 35 U.S.C. 154(b) by 268 days.

(21) Appl. No.: 13/331,941

(22) Filed: Dec. 20, 2011

(65) Prior Publication Data

US 2013/0061541 A1 Mar. 14, 2013

Related U.S. Application Data

(60) Provisional application No. 61/534,151, filed on Sep. 13, 2011.

(51) Int. Cl.
*B23P 11/02* (2006.01)
*B29C 67/00* (2006.01)

(52) U.S. Cl.
CPC ......... *B29C 67/0014* (2013.01); *B29C 67/0044* (2013.01)
USPC .......................................................... 29/447

(58) Field of Classification Search
CPC ..... B29C 57/00; B29C 67/0014; B23P 11/00; B21D 39/02; B21D 39/026
USPC .................. 29/447, 505, 521; 52/108, 741.1; 264/138; 72/120, 130
See application file for complete search history.

(56) References Cited

U.S. PATENT DOCUMENTS

| | | | |
|---|---|---|---|
| 3,601,940 A * | 8/1971 | Simon | 52/108 |
| 6,217,975 B1 | 4/2001 | Daton-Lovett | |
| 6,256,938 B1 | 7/2001 | Daton-Lovett | |
| 6,602,574 B1 | 8/2003 | Daton-Lovett | |

* cited by examiner

*Primary Examiner* — John C Hong
(74) *Attorney, Agent, or Firm* — Maschoff Brennan

(57) ABSTRACT

According to the invention, an extendable member is disclosed. The extendable member may include a structure having a first state and a second state. The structure may be deformable between the first state and the second state. In the first state the structure may include a compact form. In the second state the structure may include a hollow longeron having a slit along the entire length of the hollow longeron. One or both longitudinal edges along the slit of the hollow longeron may have lateral protrusions. The lateral protrusions of a longitudinal edge may act in such a way with the other edge, and possibly its protrusions, to at least partially inhibit relative motion of the edges.

15 Claims, 10 Drawing Sheets

Fig. 1a  PRIOR ART

SLIT TUBE LOCKING LONGERON

CROSS-REFERENCES TO RELATED APPLICATIONS

This application claims priority to Provisional U.S. Patent Application No. 61/534,151, filed Sep. 13, 2011, entitled "Slit Tube Locking Longeron," the entire disclosure of which is hereby incorporated by reference, for all purposes, as if fully set forth herein.

BACKGROUND OF THE INVENTION

This invention relates generally to deployable structures. More specifically, the invention relates to structural members which are deployable from a compact initial state.

Presently known structures that are field deployable from a stored state to an operable state suffer from disadvantages in their operable state caused by the features which make them so readily deployable. Primary among these features is flexibility. While flexibility lends itself well to compact storage, and hence portability, in the stored state, flexibility is often not a desired feature for the structure in the deployed state. This is especially true where in the deployed state the structure comprises a structural member such as a longeron or frame component.

U.S. Pat. Nos. 6,217,975, 6,256,938, and 6,602,574 disclose extendible hollow members having a slit running longitudinally along their length. Because of the slit, these hollow members suffer from a lack of necessary longitudinal and torsional rigidity. The aforementioned patents do not disclose means of addressing these inadequacies. Embodiments of the present invention provide solutions to these and other problems.

BRIEF DESCRIPTION OF THE INVENTION

In one embodiment, an extendable member is provided. The extendable member may include a structure having a first state and a second state. The structure may be deformable between the first state and the second state. In the first state the structure may include a compact form. In the second state the structure may include a hollow longeron having a slit along the entire length of the hollow longeron. One or both longitudinal edges along the slit of the hollow longeron may have lateral protrusions. The lateral protrusions of each longitudinal edge may interact in such a way to at least partially inhibit relative motion of the edges with respect to one another. This could include longitudinal motion as would be experienced due to twisting of the longeron, and/or lateral motion due to a change in the longeron's cross-sectional diameter.

In another embodiment, a method for deploying an extendable member is provided. The method may include deploying a structure from a first state to a second state. The first state may include a compact form, and the second state may include a hollow longeron having a slit along the entire length of the hollow longeron, where one or both longitudinal edges along the slit have lateral protrusions. The method may further include causing the lateral protrusions of each longitudinal edge to interact in such a way to at least partially inhibit relative motion of the edges with respect to one another. This could include longitudinal motion as would be experienced due to twisting of the longeron, and/or lateral motion due to a change in the longeron's cross-sectional diameter.

In another embodiment, a method for making a deployable member having interlocking lateral protrusions along one or both longitudinal edges is provided. The method may include modification of one or both longitudinal edges of the longeron to implement lateral protrusions that will interlock upon deployment of the extendable member. The method may further include removing, while the tube is either in the extended state or in the coiled state, material from the first edge or the second edge, or both edges, to create interlocking lateral protrusions. The method may additionally include deforming the lateral protrusions out-of-plane to provide improved feature alignment and interlocking upon deployment.

In another embodiment, a method for making a deployable member is provided. The method may include providing, in a coiled state, a tube with a longitudinal slit. In the coiled state the tube has been flattened laterally and rolled about an axis transverse to the longitudinal slit, a first edge of the longitudinal slit are located on a first side of the tube in the coiled state, and a second edge of the longitudinal slit are located on a second side of the tube in the coiled state. The method may further include removing, while the tube is in the coiled state, material from the first edge. The method may additionally include removing, while the tube is in the coiled state, material from the second edge.

BRIEF DESCRIPTION OF THE DRAWINGS

The present invention is described in conjunction with the appended figures:

FIGS. 1a-c are axonometric views of an extendable member embodiment of the invention;

FIGS. 12a-b are axonometric views of a deployment system for the embodiment shown in FIG. 8a.

Figure 1B:
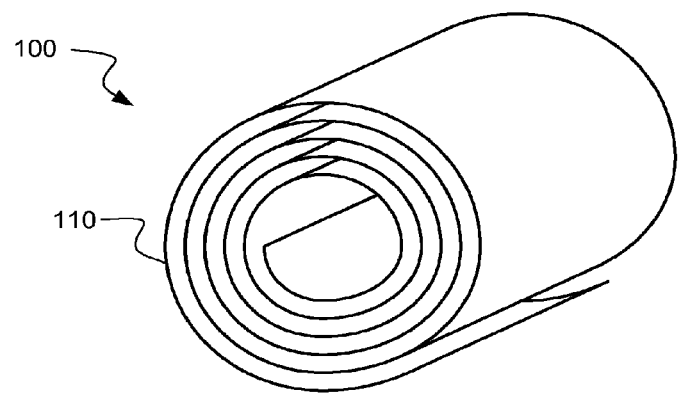
Figure 1B:
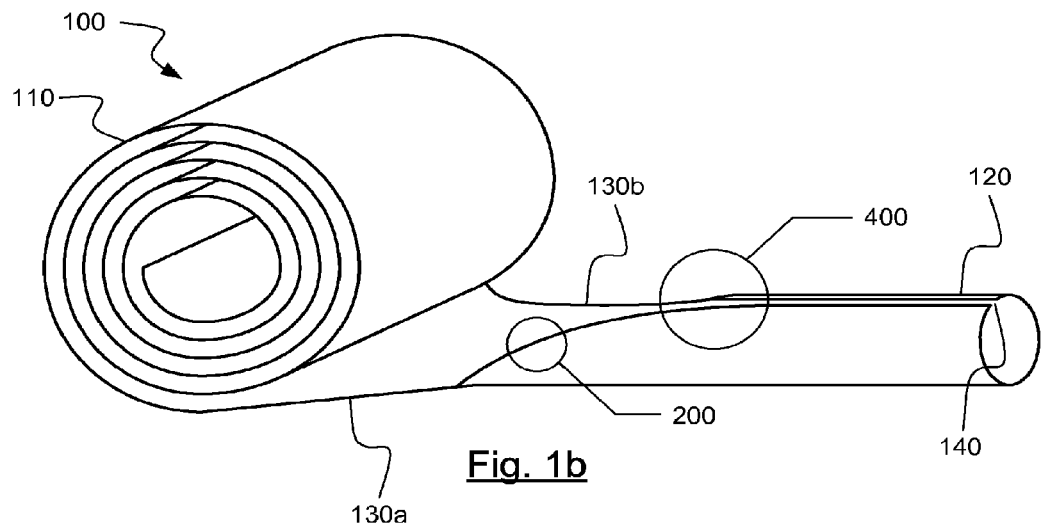

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known methods and techniques may be shown or discussed without unnecessary detail in order to avoid obscuring the embodiments.

Also, it is noted that individual embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process may end when its operations are completed, but could have additional steps not discussed or included in a figure. Furthermore, not all operations in any particularly described process may occur in all embodiments. Moreover, some steps may occur as sub-steps of other steps. A process may correspond to a method, a function, a procedure, etc.

In one embodiment of the invention, an extendable member is provided. The extendable member may include a structure having a first state and a second state. The structure may be deformable between the first state and the second state. In the first state the structure may include a compact form, possibly being wound up in a roll. In the second state the structure may include a hollow longeron having a slit along the entire length of the hollow longeron. As used herein, a "longeron" means any longitudinal member, sometimes having an approximately round cross section.

U.S. Pat. No. 6,217,975 issued on Apr. 17, 2001, U.S. Pat. No. 6,256,938 issued on Jun. 10, 2001, and U.S. Pat. No. 6,602,574 issued on Aug. 5, 2003, all to Daton-Lovett, disclose structures possibly capable of providing the features in the preceding paragraph. The entirety of each of these disclosures is hereby incorporated by reference, as if fully set forth herein, for all purposes.

In some embodiments, each longitudinal edge along the slit of the hollow longeron may have a plurality of lateral protrusions. In these and other embodiments, the lateral protrusions of each edge may be the portion of the edges furthest from the other edge along the surface circumference of the longeron.

In some embodiments, the lateral protrusions may include curved, polygonal, rectangular, square, triangular, or other shaped protrusions. In these or other embodiments, the protrusions on each edge may be regularly shaped from protrusion to protrusion, or in other embodiments the protrusions may be irregularly shaped. In some embodiments, the protrusions on each edge may also be regularly or irregularly spaced. For example, in embodiments with curved protrusions, each protrusion may have substantially identical curvature, and may be regularly spaced.

Likewise, in some embodiments, the protrusions of one edge may correspond in shape to the protrusions of the other edge, while in other embodiments the protrusions of one edge may not correspond in shape to the protrusions of the other edge. Also, in some embodiments, lateral protrusions of one edge may or may not exactly longitudinally align with the lateral protrusions of another edge. For example, in some embodiments the lateral protrusions may be longitudinally offset edge to edge by some fixed or variable amount per protrusion.

In some embodiments, the lateral protrusions of an edge may be elevated or depressed from a baseline elevation of the edge. The elevation or depression of each lateral protrusion may be consistent along the longitudinal length of the protrusion, or may vary. While in the first compact state, such elevation or depression of the lateral protrusions may be deformed such that they are substantially planar with the surrounding portions of the structure.

Opposing lateral protrusions on opposite edges may be oppositely elevated or depressed from the first edge. By way of example, if a lateral protrusion is elevated on one edge, the corresponding lateral protrusion on the other edge may be depressed, and vice-versa.

In some embodiments, in the second elongated state, one, some, or all lateral protrusions of each edge may interact in such a way to at least partially inhibit relative motion of the edges with respect to one another. In these embodiments, at least one lateral protrusion of an edge may apply a longitudinal or lateral force to at least one lateral protrusion of the other edge. The interaction and interference of the lateral protrusions provide structural rigidity and stability to embodiments of the instant invention. This may include increased stiffness and stability in torsion and bending.

In some embodiments, in the second elongated state, no two adjacent lateral protrusions of a first edge may be located on the same side of the second edge. In other words, it is possible that every other protrusion of an edge are on top (or on the bottom) of the opposite edge. In other embodiments, in the second elongated state, two or more adjacent lateral protrusions of a first edge may be located on the same side of the second edge. This may occur in embodiments whether there is either a regular or irregular overlapping of the protrusions between the edges.

In another embodiment of the invention, a method for deploying an extendable member is provided. The method may include deploying or unwinding a structure from a first state to a second state. The first state may include a compact form, and the second state may include a hollow longeron having a slit along the entire length of the hollow longeron, each longitudinal edge along the slit having lateral protrusions. The method may further include causing the lateral protrusions of each longitudinal edge to interact in such a way to at least partially inhibit relative motion of the edges with respect to one another.

In some embodiments, merely unwinding the structure from the first state to the second state may cause the lateral protrusions to interact. This may mean that the hollow longeron form may be of such dimensions that the lateral protrusions of the two longitudinal edges, upon meeting during unwinding, interact. In particular, the extent of the overlap of the two edges may cause a coil spring like effect, thereby causing the protrusions of opposing edges to push against each other. In other embodiments, an additional step of causing the lateral protrusions to interact may occur, causing the hollow longeron to tighten and the lateral protrusions to at least more closely interact.

In yet another embodiment of the invention, a method for making a deployable member is provided. The method may include providing, in a coiled state, a tube with a longitudinal slit. In the coiled state the tube has been flattened laterally and rolled about an axis transverse to the longitudinal slit, a first edge of the longitudinal slit are located on a first side of the tube in the coiled state, and a second edge of the longitudinal slit are located on a second side of the tube in the coiled state. The method may further include removing, while the tube is in the coiled state, material from the first edge. The method may additionally include removing, while the tube is in the coiled state, material from the second edge.

In some embodiments, the material removed from the first edge may be at least partially removed linearly between a center of the tube in the coiled state and a location on the circular circumference of the tube in the coiled state. Likewise, in these or other embodiments, the material removed from the second edge may be at least partially removed linearly between a center of the tube in the coiled state and a location on the circular circumference of the tube in the coiled state. In some embodiments, a cross section of the material removed from the first edge may have a triangular cross section. In other embodiments, different cross sections of removed material may exist, even differing on a single tube.

In some embodiments, the material removed from the first edge may be removed in a first pattern radiating from a center of the tube in the coiled state at a particular angular frequency. The material removed from the second edge may be removed in a second pattern radiating from the center of the tube in the coiled state at the particular angular frequency, wherein the second pattern is offset from the first pattern by half of the angular frequency. In other embodiments, there may be no offset. Removing material from the first edge and second edge may be accomplished, in some embodiments, via a milling machine.

In some embodiments, the method may further include unrolling, at least partially, the tube from the coiled state, and deforming at least a portion of the first edge. The first edge may be deformed such that a first portion of the first edge, between a second portion of the first edge and a third portion of the first edge where material has been removed, is deformed outward from a center of the tube. A fourth portion of the first edge, between the third portion of the first edge and a fifth portion of the first edge where material has been removed, may be deformed inward toward the center of the tube.

In these embodiments, the method may also include deforming at least a portion of the second edge. The second edge may be deformed such that a first portion of the second edge, between a second portion of the second edge and a third portion of the second edge where material has been removed, is deformed inward toward the center of the tube. A fourth portion of the second edge, between the third portion of the second edge and a fifth portion of the second edge where material has been removed, may be deformed outward from the center of the tube. In the above described embodiments, the first portion of the first edge may overlap the first portion of the second edge when the tube is unrolled, and the fourth portion of the second edge may overlap the fourth portion of the first edge when the tube is unrolled. In some of these embodiments, the first portion of the first edge may be a triangular shaped protrusion, and the first portion of the second edge may be a trapezoidal shaped protrusion.

In some embodiments, only one edge may include deformations. In other embodiments, neither edge may include deformations. In some embodiments, these deformations may be accomplished by heating the protrusions and bending them in the desired direction. This may especially be the case where heat affected shape memory material is employed for the tube material, either at the edge only or throughout the entire structure.

Figure 1C:
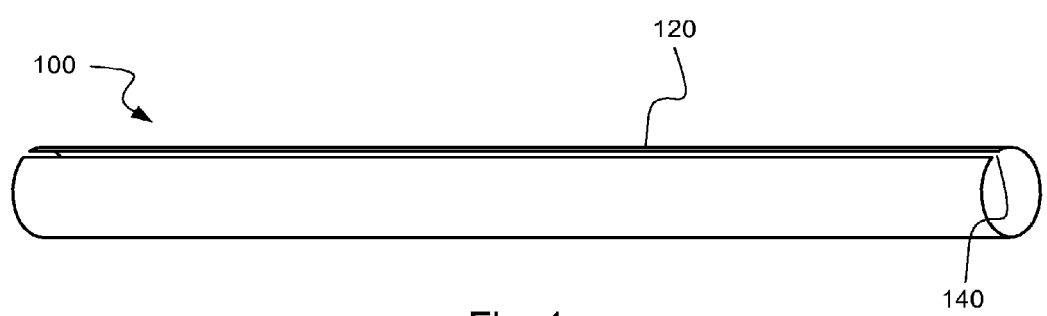

Turning now to FIGS. 1a-c, axonometric views of an extendable member 100 of the invention are shown. FIG. 1a shows member 100 in its first state, a compact form. In this example, the compact form comprises member 100 wound up in a coil 110. Though shown loosely coiled, coil 110 may be more or less tightly wound than shown. The material from which member 100 is constructed may be any number of possible materials, including, but not limited to, metals, alloys, polymers, temperature dependent shape memory materials, fiber reinforces thermoset materials, fiber reinforced thermoplastic materials, etc. Additionally, the material of member 100 may be of any thickness.

FIG. 1b shows member 100 as it is being unwound. Due to the characteristics of the material from which member 100 is composed, possibly as discussed in U.S. Pat. Nos. 6,217,975, 6,256,938, and 6,602,574, structure 100 unrolls into a hollow longeron 120 from coil 110. Member 100 has lateral protrusions 200 along each edge 130 which will be shown in detail in FIGS. 2a-e and FIGS. 3a-e. Note that edges 130 meet and form slit 140 along the length of longeron 120. The joining 400 of edges 130 will be shown in detail in FIGS. 4a-c. Note that throughout this disclosure, "longitudinal" shall refer to the direction parallel to the length of longeron 120, "lateral" shall refer to the direction perpendicular to longitudinal and extending away from edges 130 (toward the other edge in the longeron 120 state), and "elevation" shall refer to the direction above and below the edges and perpendicular to both lateral and longitudinal directions.

Figure 2A:
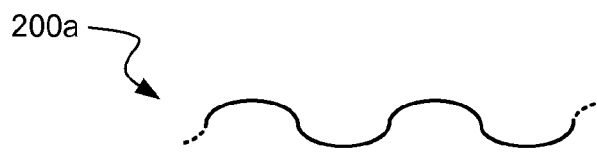
FIGS. 2a-f are close-up plan views of possible lateral protrusions of various embodiments of the invention.

FIGS. 2a-f show close-up plan views of possible lateral protrusions 200 of various embodiments of the invention. FIG. 2a shows a curved lateral protrusion 200a. Note that like all protrusions discussed herein, the figures may show over or under exaggerated shapes for the purposes of illustration.

Figure 2B:
Figure 2C:
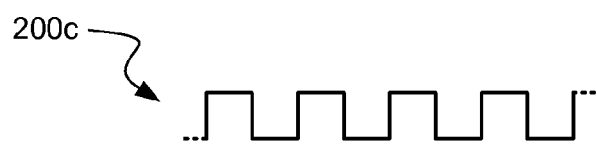
Figure 2D:
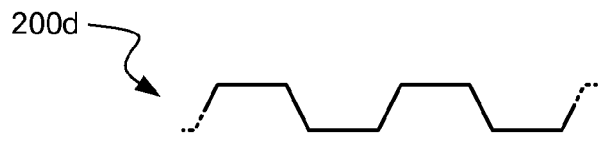
Figure 2E:
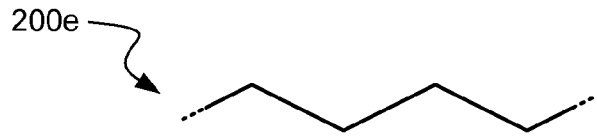
Figure 2F:
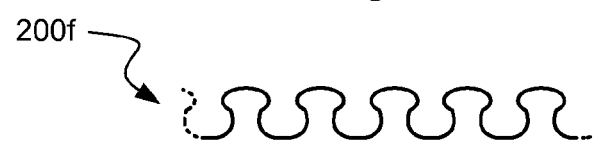

FIG. 2b shows a rectangular lateral protrusion 200b. FIG. 2c shows a square lateral protrusion 200c. FIG. 2d shows a trapezoidal lateral protrusion 200d. FIG. 2e shows a triangular lateral protrusion 200e. Finally, FIG. 2f shows a hammerhead shaped lateral protrusion 200f (opposing edge hammerhead shaped protrusions may fit in-between the protrusions on the shown edge). Other shapes of possible protrusions 200 will now be apparent to those of skill in the art, and may be employed in various embodiments of the invention.

Figure 3A:
FIGS. 3a-e are close-up elevation views of possible lateral protrusions of various embodiments of the invention.

FIGS. 3a-d show close-up elevation views of possible lateral protrusions 200 of various embodiments of the invention. FIG. 3a shows protrusions 200f which are all elevated. Note that though FIGS. 3a-d show curved protrusions, the possible elevation variations shown herein may be applied to any shape of protrusion.

Figure 3B:
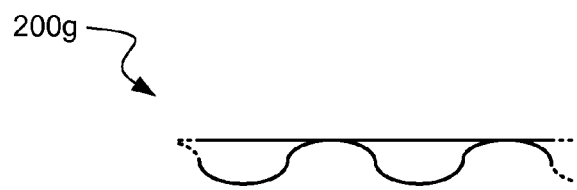
Figure 3C:
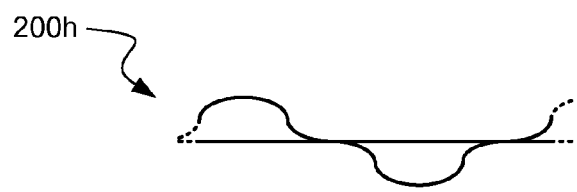
Figure 3D:
Figure 3E:

FIG. 3b shows protrusions 200g which are all depressed. FIG. 3c shows protrusions 200h which are alternatingly elevated and depressed. FIG. 3d shows protrusions 200i which are flat, and neither elevated or depressed. FIG. 3e shows a protrusion 200j which has a varying slope along its longitudinal length.

Different shapes of protrusions 200 may be employed in different applications to provide greater rigidity of longeron 120 once such protrusions 200 from each edge 130 have interfaced. Also, different shapes of protrusions 200 may be further employed to provide smoother and more regular interfacing of edges 130.

Figure 4A:
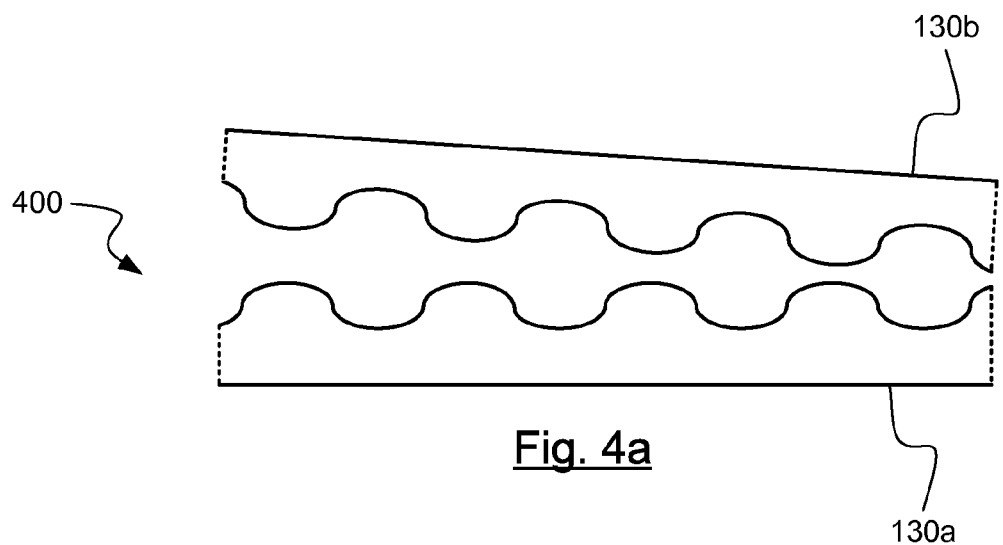
FIGS. 4a-c are close up views of the two edges of a longeron interfacing together.
Figure 4B:
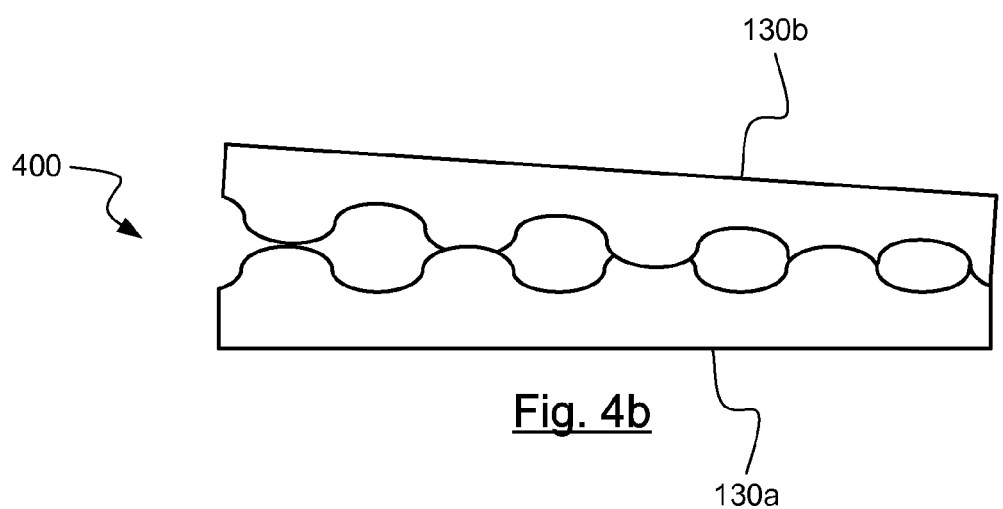
Figure 4C:
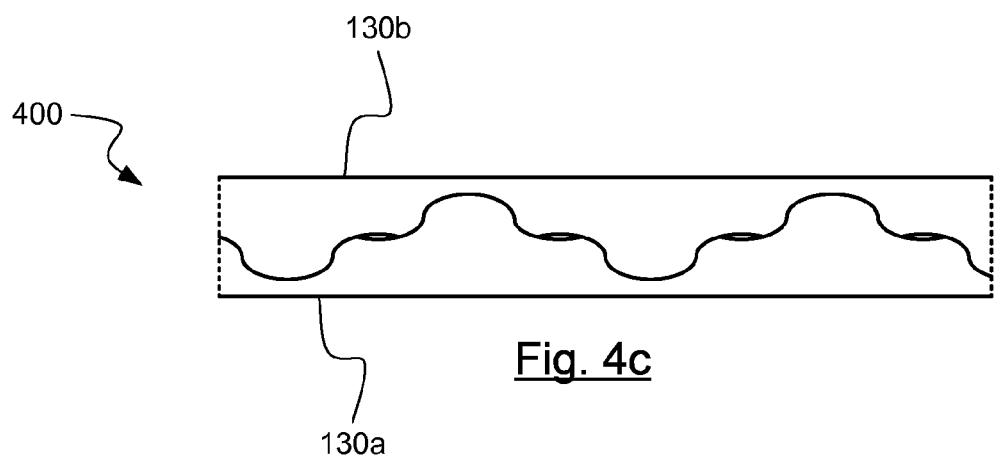

FIGS. 4a-c show close up views of the two edges of a longeron interfacing together. FIG. 4a shows edges 130a, 130b as they near interfacing. FIG. 4b shows edges 130a, 130b as they begin to interface. Finally, FIG. 4c shows edges 130a, 130b after they are fully interfaced. As discussed above, protrusions 200 may not interface alternatingly as shown in FIGS. 4a-c, and instead may interface at different alternating patterns, or perhaps randomly as edges 130 meet.

Figure 5A:
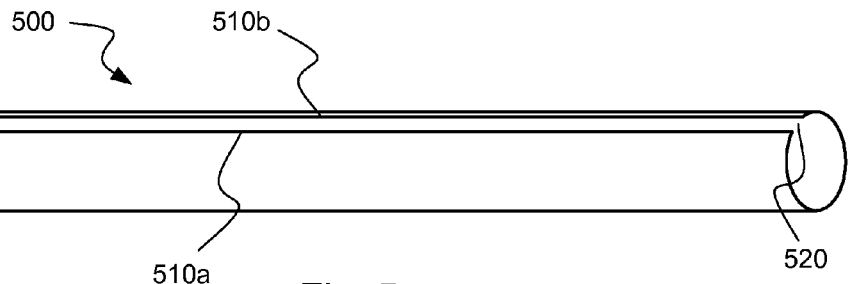
FIGS. 5a-b show distortion of a longeron without edges having lateral protrusions.
Figure 5B:
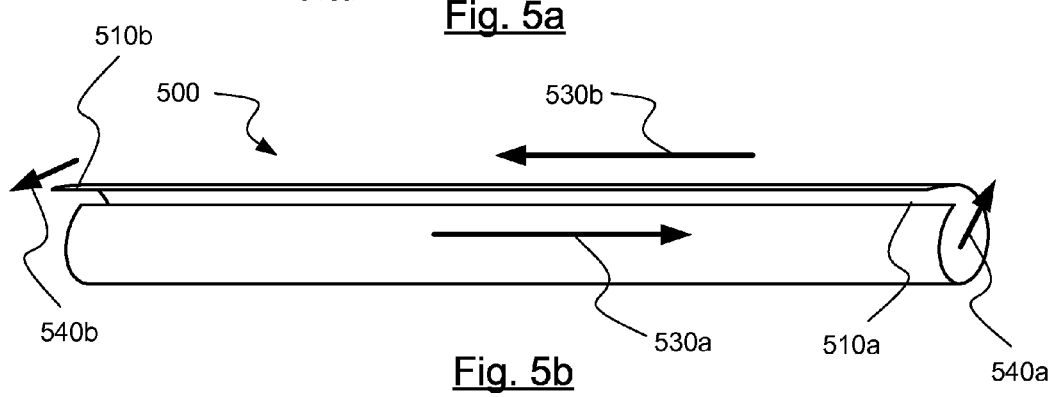

FIGS. 5a-b show distortion of a longeron 500 where edges 510 do not have lateral protrusions. FIG. 5a shows longeron 500 where no external stresses are applied. There is hence no noticeable distortion of the longeron. However, once external stresses are applied in FIG. 5b, because slit 520 is not closed by protrusions on each edge 510 interfacing, longeron 500 is freer to deform in the longitudinal directions shown by arrows 530 (arrow 530a for edge 510a; arrow 540b for edge 510b). Like wise, lateral deformation is also possible for each edge as shown by arrow 540a for edge 510a, and arrow 540b for edge 510b.

Figure 6A:
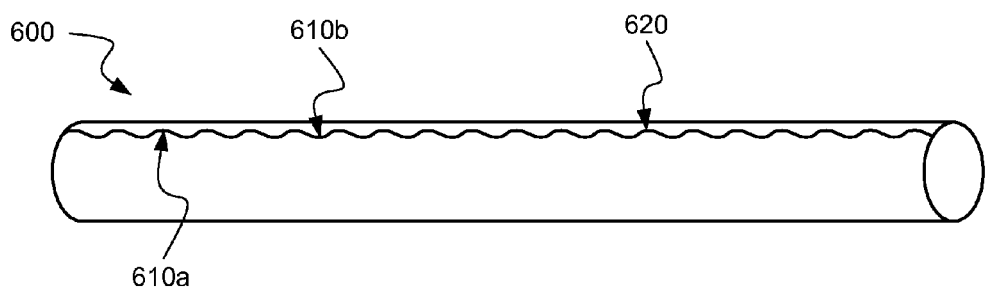
FIGS. 6a-b show the lack of distortion of a longeron which has edges with interfacing lateral protrusions.
Figure 6B:
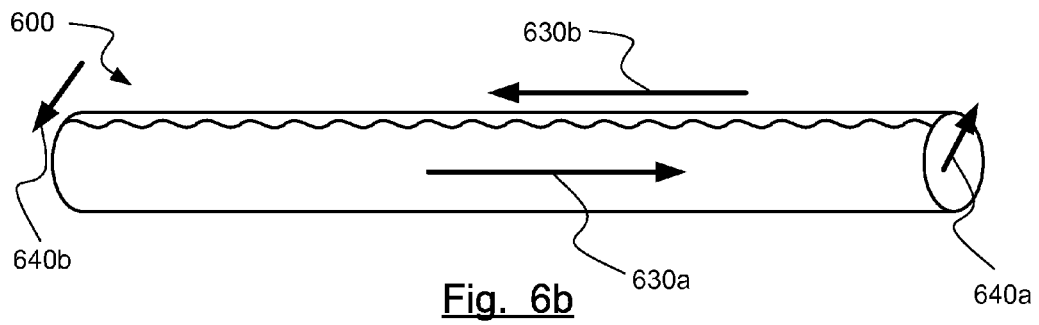

FIGS. 6a-b show the lack of distortion of a longeron 600 which has edges 610 with interfacing lateral protrusions 620 as found in various embodiments of the instant invention. FIG. 6a shows an unstressed longeron 600. FIG. 6b shows that, because of the interfacing protrusions of each edge 610, even when external stresses 630 are applied, longitudinal deformation is reduced or eliminated. Likewise, when external stresses 640a, 640b are respectively applied to edges 610a, 610b, lateral/torsional deformation is also reduced or eliminated.

Figure 7:
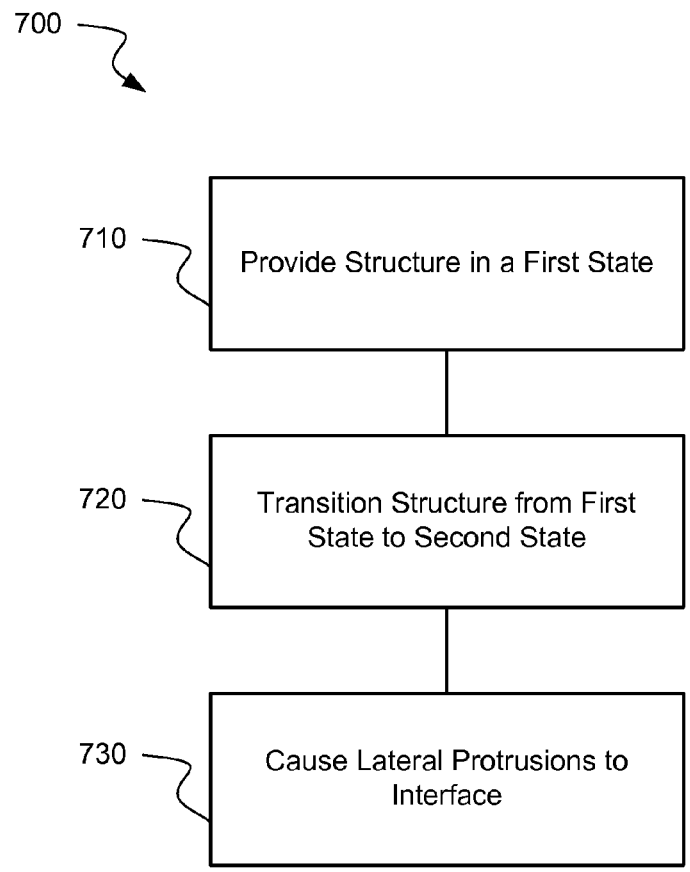
FIG. 7 is a block diagram of a method of the invention for deploying an extendable member.

FIG. 7 is a block diagram of a method 700 of the invention for deploying an extendable member. At block 710, a structure 100 is provided in a first state 110. At block 720, the structure 100 is transitioned from the first state 110 to a second state 120. At block 730, lateral protrusions 200 of the structure 100 are interfaced to provide a more rigid structure 100.

Figure 8A:
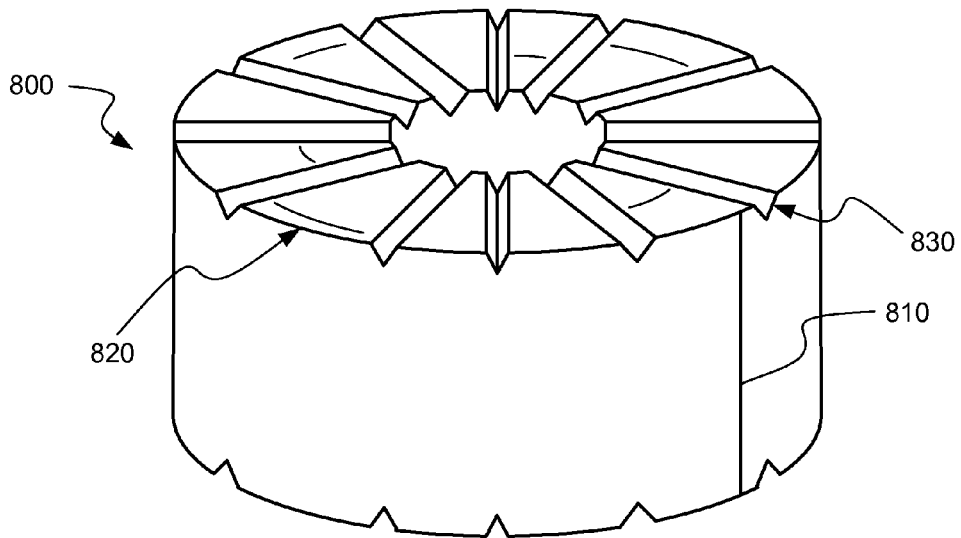
FIG. 8a shows a coiled up slit-tube with material removed to create protrusions on each side of the tube's slit.

FIG. 8a shows a rolled up tube 800 of the invention after it has been milled to create protrusion tabs 820 on each side of the tube 800 in a rolled up state. FIG. 8a also shows the end 810 of tube 800, and channels 830 are where material has been removed by the milling process (rolled up tube 800 may have been flipped to mill channels 830 on each side). FIG. 8a also shows how channels 830 could be used as key channels to facilitate rolling out or in tube 800 using a rotational power mechanism having a key mated to channels 830 and the angular distribution thereof on the rolled up tube 800.

Figure 8B:
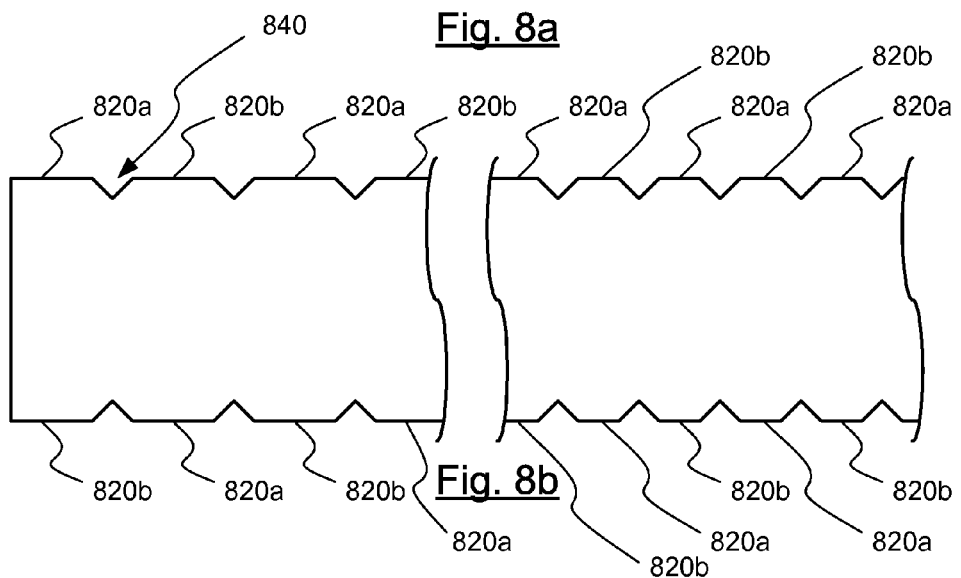
FIG. 8b shows the tube from FIG. 8a rolled out and flattened.

FIG. 8b shows a portion of tube 800 rolled out and flattened (to show detail of protrusions 810). Tabs 820a may be deformed in one direction (for example, out of the page of FIG. 8b). Meanwhile, tabs 820b may be deformed in the opposite direction (for example, into the page of FIG. 8b). Thus, when these tabs meet in the tube's tubular form, they will overlap, with alternating tabs overlapping in alternating directions. Notice also how FIG. 8b shows that the distance between removed portions 840 may decrease as the inner portion of the rolled up tube 800 are rolled out. This is acceptable, and does not interfere with the tabs matching each other for locking purposes, as both sides of the tube's slit experience the same gradual increased resolution of edge detail as the roll is deployed.

Figure 9:
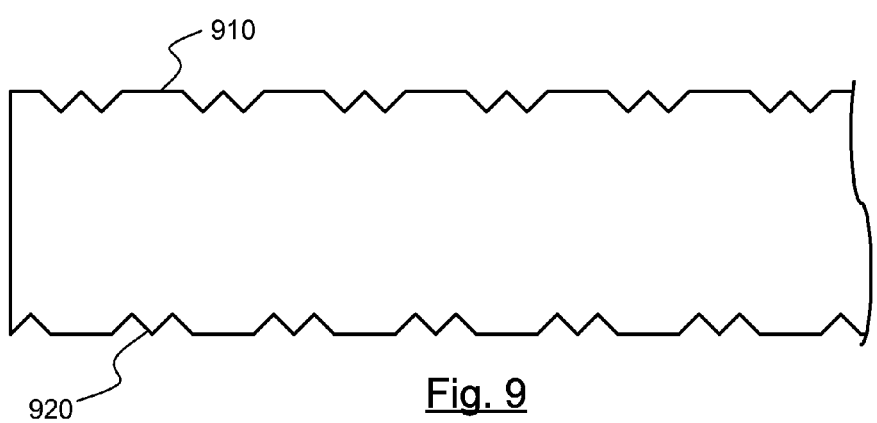
FIG. 9 shows another possible tube of the invention rolled out and flattened.

FIG. 9 shows an alternative tube 900 of the invention which demonstrates how varying protrusion/teeth patterns may be employed. In the embodiment shown in FIG. 9, the radial milling pattern was offset on one side of rolled up tube 900 by half of the angular frequency of the milling pattern to produce an alternating offset of the features of one edge with the other.

Tube 900 includes trapezoidal protrusions 910, as well as triangular protrusions 920. In this embodiment, triangular protrusions 920 may be deformed outwards from the tube's center, while the trapezoidal protrusions 910 may be deformed inwards toward the tube's center. In this manner, trapezoidal protrusions 910 will tuck under their matching triangular protrusions 920 on the opposite side of the slit when rolled out. When rolled up, the elevated and depressed protrusions may elastically deform to conform with the shape of the roll, thereby providing as compact a rolled up form as prior to the deformation of the protrusions.

Figure 10:
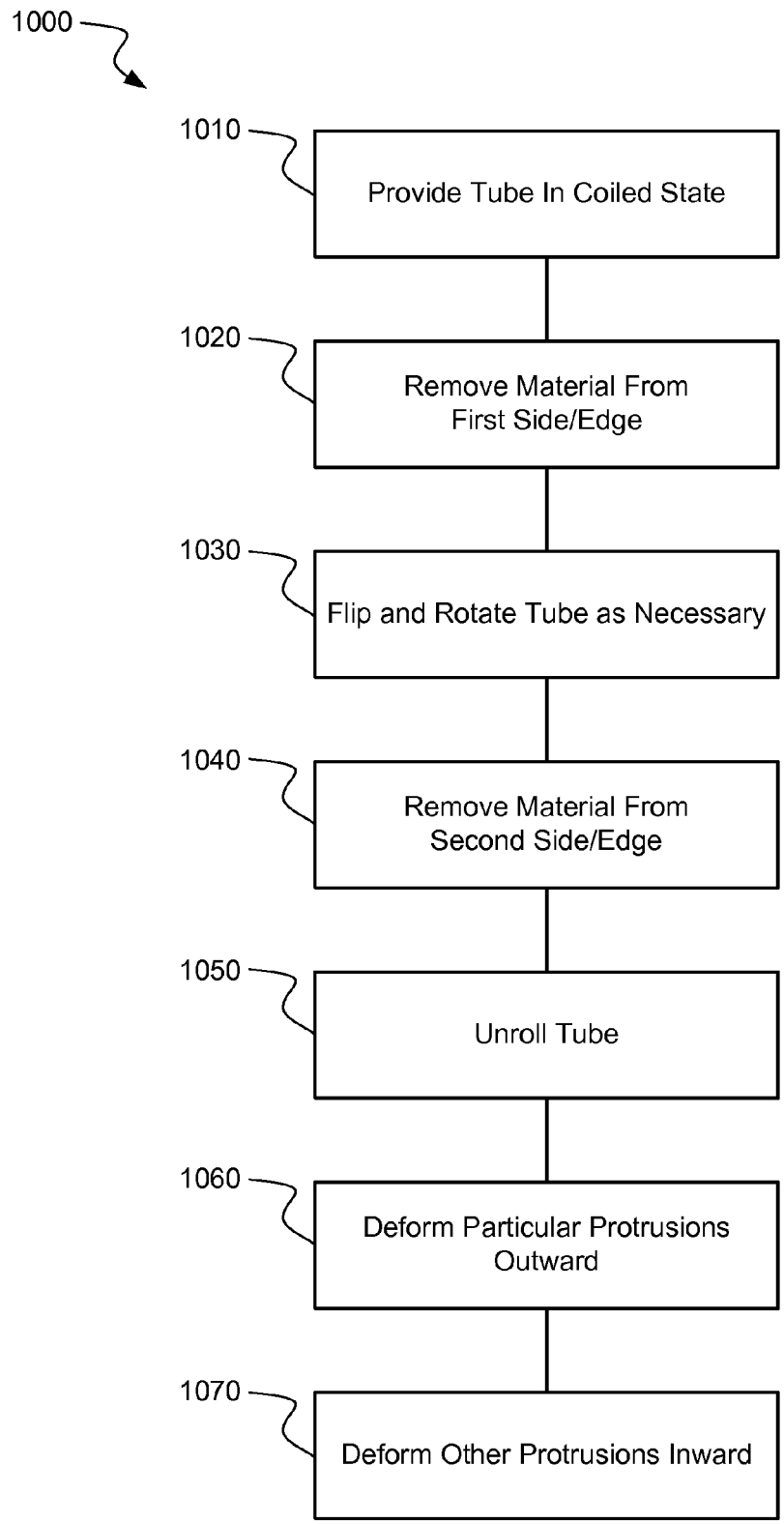
FIG. 10 is a block diagram of a method of the invention for making a deployable member.

FIG. 10 is a block diagram of a method 1000 of the invention for making a deployable member. This method 1000, as discussed above and herein, may be used to create any of the embodiments of deployable members discussed in this disclosure. Method 1000 may have fewer or greater number of steps as shown in this example embodiment.

At block 1010, a tube in a coiled state is provided. At block 1020, material is removed from the first side of the coiled-up tube, thereby producing protrusions on the first edge. At block 1030 the coiled-up tube is flipped, and reoriented if an angular offset between the first side/edge and second side/edge is desired. At block 1040, material is removed from the second side of the coiled-up tube, thereby producing protrusions on the second edge.

At block 1050, the tube is either partially or entirely unrolled. At block 1060, some of the protrusions may be deformed outwards (from the longitudinal axis-center of the tube). At block 1070, other protrusions, possibly all of the remaining protrusions, may be deformed inwards (toward the longitudinal axis-center of the tube).

Figure 11:
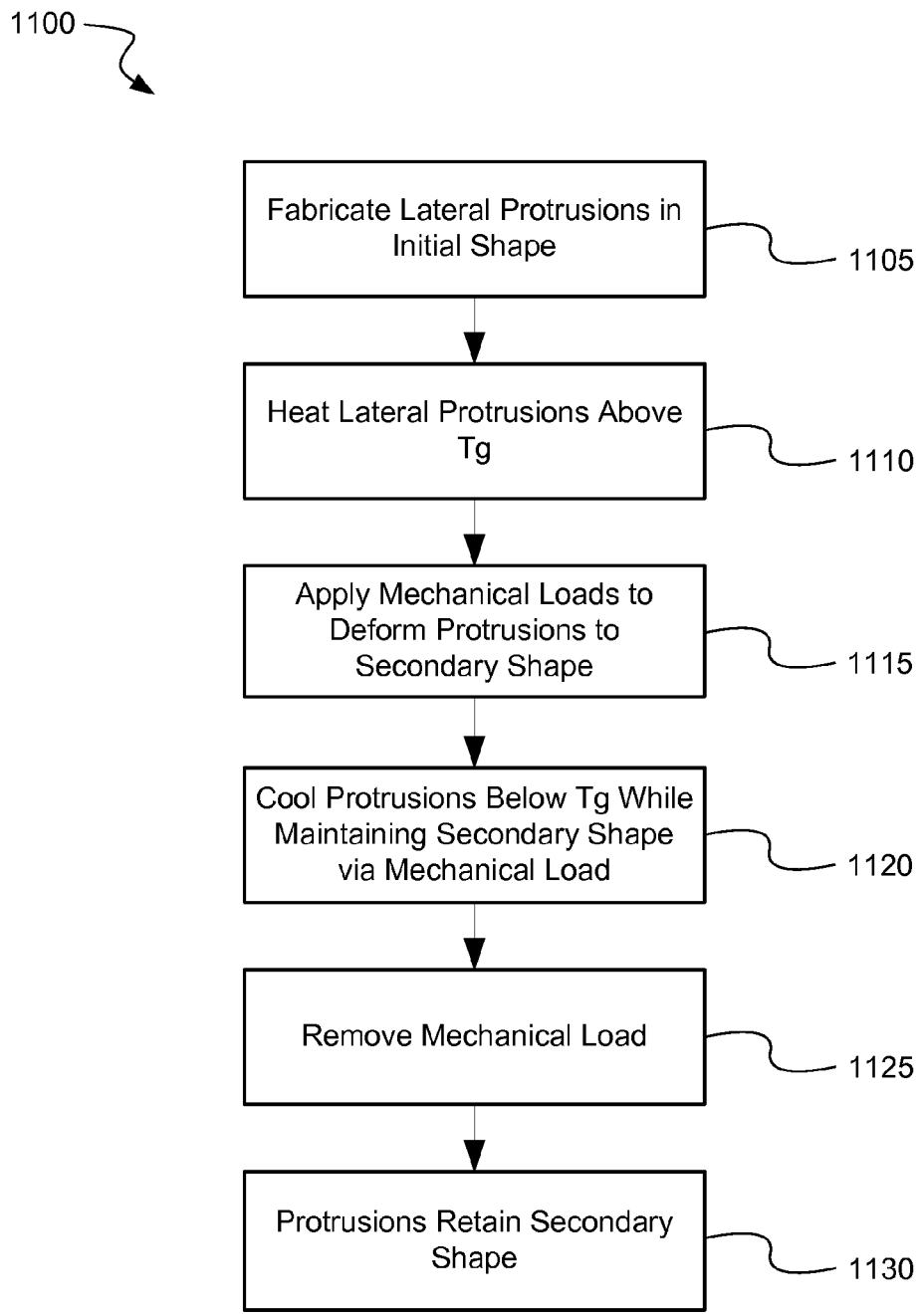
FIG. 11 is a block diagram of a method of the invention for deforming lateral protrusions on various embodiments.

FIG. 11 is a block diagram of a method 1100 of the invention for deforming lateral protrusions on various embodiments as mentioned above in regards to steps 1060, 1070 where the entire longeron, or just the edge region including the protrusions, includes a shape memory material. In method 1100, at block 1105, the lateral protrusions are fabricated in their initial state. At block 1110, the lateral protrusions are heated above the shape memory materials glass transition temperature, resulting in reduced modulus and increased strain capability.

At block 1115, mechanical loads are applied to the protrusions to deform them into the desired shape. At block 1120, the protrusions are cooled, either passively (i.e., natural convection) or actively (i.e., forced convection or conduction). The deformed protrusions are constrained in the desired shape throughout cooling until a temperature below the glass transition temperature is reached. At block 1125, all mechanical constraints are removed. At block 1130, the protrusions will retain the desired shape when the longeron is in the deployed state, unless the process is reversed by heating the shape memory material to above its glass transition temperature. The application of mechanical forces to the protrusions as the longeron is rolled to a compact state will cause the protrusions to deflect such that they become planar with the flattened longeron in the compact state. However, this deflection is elastic in nature and the protrusions regain their deformed shape upon deployment of the longeron.

Figure 12A:
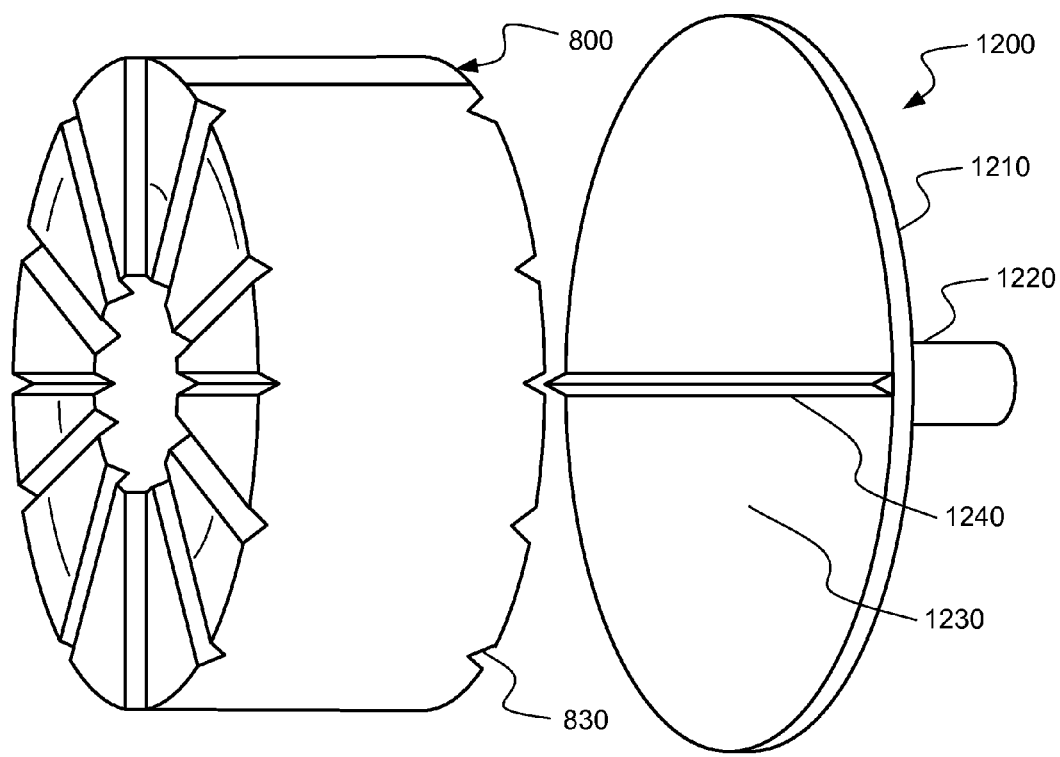
Figure 12B:
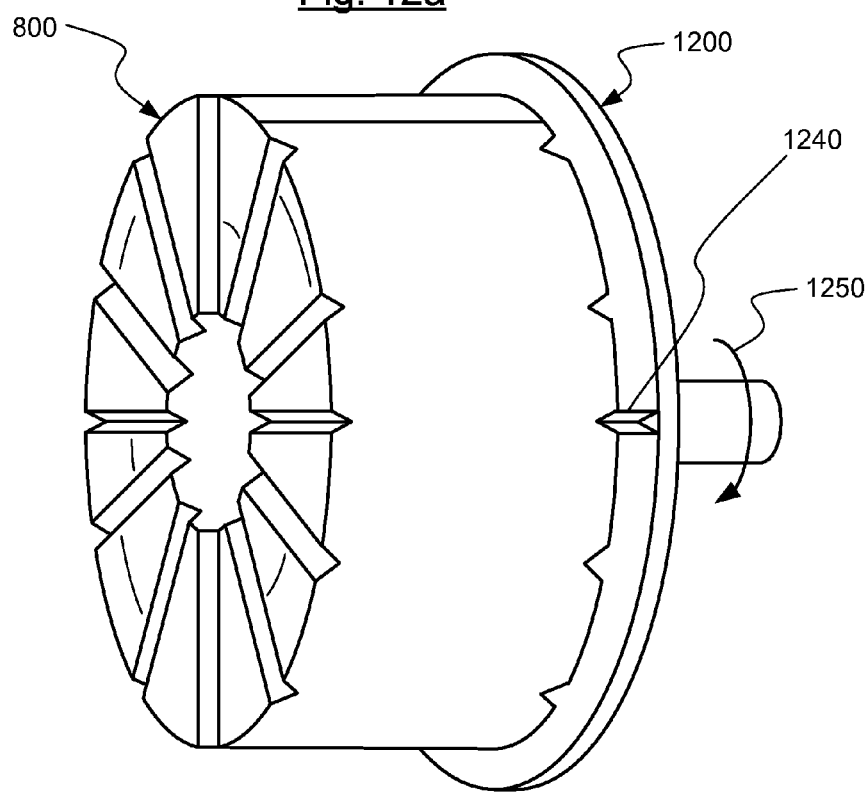

FIG. 12a is an axonometric view of a deployment system 1200 for tube 800 shown in FIG. 8a. Deployment system 1200 may include a spindle 1210 fixedly coupled with a rotatable drive shaft 1220. Spindle 1210 may include a flat surface 1230 and a key 1240 fixedly coupled with flat surface 1230. A drive system (not shown) may me employed to rotate drive shaft 1220. Key 1240 may be complimentarily shaped to channels/notches 830. FIG. 12b shows deployment system 1200 engaged with tube 800. When the drive system is actuated, it rotates spindle 1210 in the direction shown by arrow 1250. Key 1240, which is engaged with channels/notches 830, causes tube 800 to roll out and form as shown in FIGS. 1a-c.

Note that while only one key 1240 extending over the entire diameter of rolled up tube 800 is shown in FIGS. 12a-b, additional keys may be present in other embodiments, and such additional keys may interface with other channels of tube 800. In some embodiments, one or more keys may only extend over a radius of tube 800 rather than the entire diameter. In these or other embodiments, a similar additional deployment system may be employed on the opposite side of rolled up tube 800. This additional deployment system may or may not be rotationally powered. In non-powered systems, the additional deployment system may merely positively engage channels/notches and rotate freely based on actuation of the rotation source of the other deployment system 1200.

The invention has now been described in detail for the purposes of clarity and understanding. However, it will be appreciated that certain changes and modifications may be practiced within the scope of the appended claims.

What is claimed is:

1. A method for making a deployable member, wherein the method comprises:
   providing, in a coiled state, a tube with a longitudinal slit, wherein in the coiled state:
      the tube has been flattened laterally and rolled about an axis transverse to the longitudinal slit;
      a first edge of the longitudinal slit is located on a first side of the tube in the coiled state; and
      a second edge of the longitudinal slit is located on a second side of the tube in the coiled state;
   removing, while the tube is in the coiled state, material from the first edge; and
   removing, while the tube is in the coiled state, material from the second edge.

2. The method for making a deployable member of claim 1, wherein:
   the material removed from the first edge is at least partially removed linearly between a center of the tube in the coiled state and a location on the circular circumference of the tube in the coiled state.

3. The method for making a deployable member of claim 2, wherein a cross section of the material removed from the first edge has a triangular cross section.

4. The method for making a deployable member of claim 1, wherein:
   the material removed from the first edge is removed in a first pattern radiating from a center of the tube in the coiled state at a particular angular frequency;
   the material removed from the second edge is removed in a second pattern radiating from the center of the tube in the coiled state at the particular angular frequency, wherein the second pattern is offset from the first pattern by half of the angular frequency.

5. The method for making a deployable member of claim 1, wherein removing material from the first edge comprises:
   milling material from the first side of the tube in the coiled state.

6. The method for making a deployable member of claim 1, wherein the method further comprises:
   unrolling, at least partially, the tube from the coiled state; and
   deforming at least a portion of the first edge such that:
      a first portion of the first edge, between a second portion of the first edge and a third portion of the first edge where material has been removed, is deformed outward from a center of the tube; and
      a fourth portion of the first edge, between the third portion of the first edge and a fifth portion of the first edge where material has been removed, is deformed inward toward the center of the tube.

7. The method for making a deployable member of claim 6, wherein the method further comprises:
   deforming at least a portion of the second edge such that:
      a first portion of the second edge, between a second portion of the second edge and a third portion of the second edge where material has been removed, is deformed inward toward the center of the tube; and
      a fourth portion of the second edge, between the third portion of the second edge and a fifth portion of the second edge where material has been removed, is deformed outward from the center of the tube.

8. The method for making a deployable member of claim 7, wherein:
   the first portion of the first edge overlaps the first portion of the second edge when the tube is unrolled; and
   the fourth portion of the second edge overlaps the fourth portion of the first edge when the tube is unrolled.

9. The method for making a deployable member of claim 6, wherein:
   the first portion of the first edge comprises a triangular shaped protrusion.

10. The method for making a deployable member of claim 6, wherein:
    the first portion of the second edge comprises a trapezoidal shaped protrusion.

11. The method for making a deployable member of claim 6, wherein:
    the first portion of the second edge comprises a hammerhead shaped protrusion.

12. The method for making a deployable member of claim 6, wherein:
    the tube comprise a shape memory material; and
    deforming at least a portion of the first edge comprises:
       heating the first portion to above a glass transition temperature ($T_g$);
       applying a mechanical load to the first portion to deform the first portion;
       cooling the first portion to below the glass transition temperature ($T_g$); and
       removing the mechanical load.

13. The method for making a deployable member of claim 6, wherein:
    the tube comprise a thermoplastic material; and
    deforming at least a portion of the first edge comprises:
       heating the first portion to above a softening point temperature;
       applying a mechanical load to the first portion to deform the first portion; and
       cooling the first portion to below the softening point temperature.

14. The method for making a deployable member of claim 6, wherein:
    the tube comprise a metal; and
    deforming at least a portion of the first edge comprises applying a mechanical load to the first portion to deform the first portion, wherein the mechanical load exceeds a yield strength of the metal.

15. The method for making a deployable member of claim 1, wherein:
    at least a first portion of material removed from the first edge comprises a notch; and
    the method further comprises coupling the tube in the coiled state with a deployment system having a key that inserts into at least one notch.

* * * * *